Patented Feb. 11, 1947

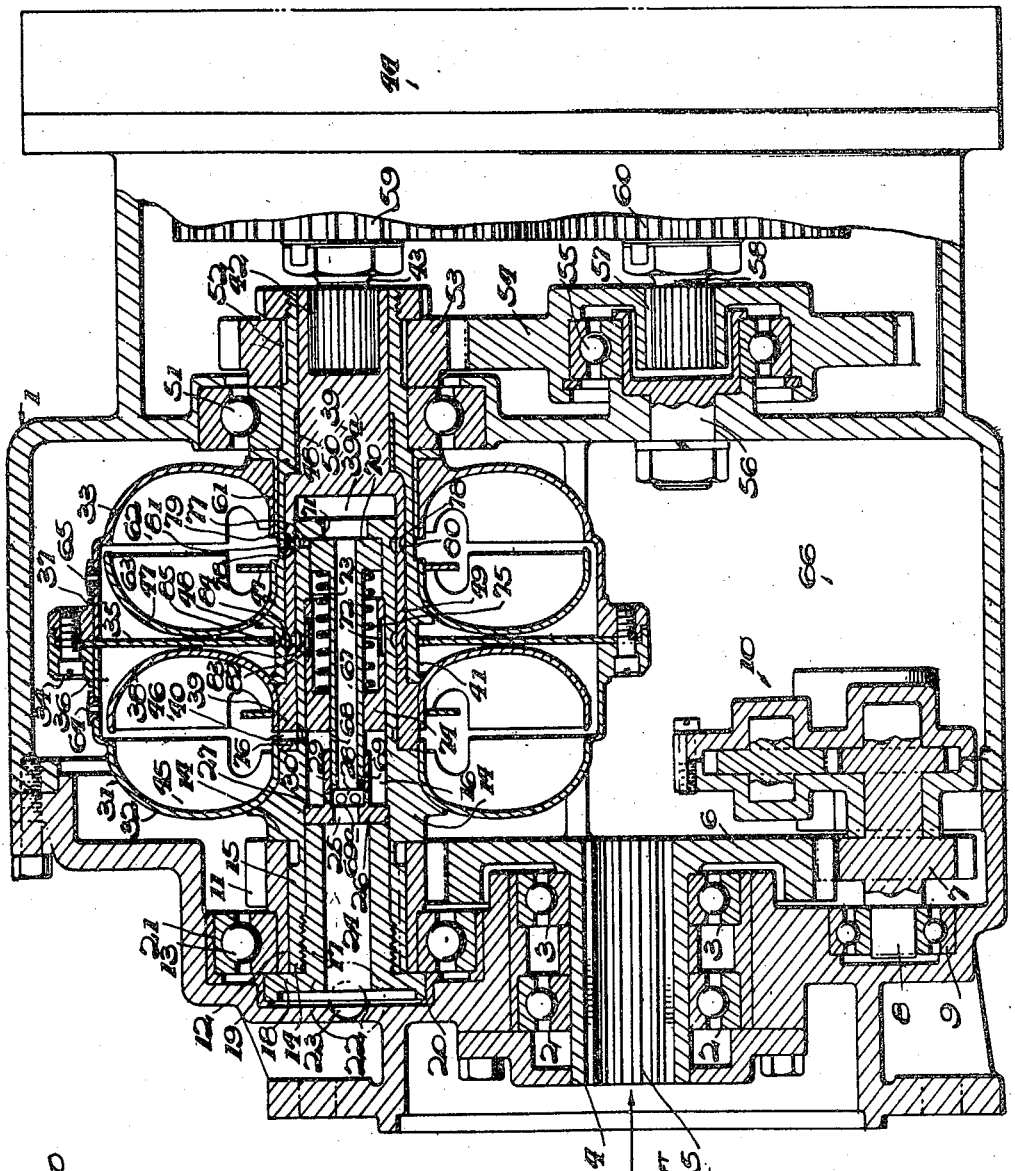

2,415,760

UNITED STATES PATENT OFFICE 2,415,760

CONTROL DEVICE AND SYSTEM

Finley R. Porter, Southampton, N. Y., assignor to Bendix Aviation Corporation, Teterboro, N. J., a corporation of Delaware Application December 28, 1943, Serial No. 515,965

5 Claims. (Cl. 137—153)

This invention relates to control devices, and systems, and means for regulating speed differentials between driving and driven members, and has particular reference to a novel control valve, fluid coupling unit, and an automatic speed changing drive for maintaining the speed of a supercharger, blower, fan, or other suitable driven mechanism within operating limits, when directly connected to a driving mechanism, such as an aircraft engine, or other suitable driving means having a speed range not consistent with the required operating limits of the driven mechanism.

An object of my invention, therefore, is to provide a novel drive having automatic means for changing the operating characteristic thereof so as to conform to varying operating requirements.

Another object of my invention is to provide a novel combination of two or more fluid couplings for transmission of power to a driven member, and means for selectively operating the said fluid couplings for controlling the transmission ratio between driving and driven members.

Another object of my invention is to provide a novel combination of a plurality of fluid couplings for transmission of power from a driving member to a driven member and a distributing valve operated through the output pressure of a pump driven by the driving member for selectively operating the fluid couplings so as to control the transmission ratio between the driving and driven members.

Another object of my invention is to provide a novel snap action distributing valve for controlling the operation of the said fluid couplings.

Another object of my invention is to provide a novel pressure responsive snap action distributing valve having a first control member for opening a first pressure inlet at a first pressure value, and a second control member for closing the said inlet at a second pressure value, and the second control member so arranged that upon closing the first inlet the same will open a second pressure inlet.

Another object of my invention is to provide a novel fluid coupling unit providing a driving member and a plurality of driven members rotatably mounted therein, and means for selectively operating the said driven members from the driving member.

Another object of my invention is to provide a novel fluid coupling unit having a driving member and a plurality of driven members, together with means for selectively supplying a fluid coupling medium for coupling the driving member to one of the driven members.

Another object of my invention is to provide a novel valve mechanism, including first and second condition responsive means for alternately controlling the actuation of a pair of control devices in response to predetermined condition values.

Another object of my invention is to provide a novel arrangement, including a first condition responsive means movable from a first to a second position for causing the operation of a device upon a first predetermined condition, and a second condition responsive means movable from a first to a second position for terminating the operation of the device in response to a second predetermined condition, and means operated by the second condition responsive means for causing the first condition responsive means to return from the second to the first position upon the occurrence of the second predetermined condition.

Another object of my invention is to provide a novel mechanism, including first pressure responsive means, actuating means for causing the operation of a first fluid coupling in response to a pressure of a first predetermined value, and a second pressure responsive means for actuating means for terminating the operation of the first fluid coupling means and initiating the operation of a second fluid coupling means in response to a pressure of a second predetermined value, and other means actuated by the second pressure responsive means for biasing the first pressure responsive means to its original position.

Another object of my invention is to provide novel power transmission means for selectively using one or the other of the shafts of a blower of the Root's type for the transmission of power to the blower.

Other objects and advantages of this invention are set forth in the following description, taken with the accompanying drawings; and the novel features thereof are pointed out in the appended claims. The disclosure, however, is illustrative only and I may make changes in detail, especially in matters of shape, size and arrangement of parts within the principle of the invention to the full extent indicated by the broad and general meanings of the terms in which the appended claims are expressed.

In the accompanying drawing which forms a part of this specification, like characters of reference indicate like parts in the several views, wherein:

Figure 1 is a sectional view of my novel power transmission.

Figure 2 is a somewhat enlarged perspective view of my novel control valve shown in section in Figure 1.

Referring to the drawing in detail and particularly to Figure 1, the numeral 1 indicates a casing or housing within which is rotatably mounted on roller bearings 2 and 3 a driving member or shaft 4. The shaft 4 has provided therein internal splines 5 for connection to a driving shaft of a conventional aircraft engine not shown. The driving shaft 4 has formed integral therewith a gear 6, which is arranged to intermesh with a gear 7 having a shaft 8 rotatably mounted at one end in roller bearings 9. The opposite end of the shaft 8 is drivingly connected to a suitable gear pump 10, for a purpose which will be explained hereinafter.

The gear 6 is also arranged to intermesh with a gear 11 having a collar 12 rotatably mounted on anti-friction bearings 13. Concentrically positioned in the gear 11 and collar 12 is a shaft 14 connected to the gear 11 by suitable splines 15.

The shaft 14 has concentrically drilled therein a channel 16, in which is screw threadedly engaged a sleeve 17 having an annular flanged portion 18. The sleeve 17 is tightened within the shaft 14 so as to position the flanged portion 18 against an end of the shaft 14 and collar 12. The outer edge of the annular flange 18 slides within a raceway 19 provided in a plate 20 positioned in the casing 1. There is also provided in the plate 20 a raceway 21 in which are positioned the anti-friction bearings 13. The plate 20 has provided a suitable orifice 22, which opens from a channel 23 formed in the casing 1 into one end of a channel 24 formed in the sleeve 17. The opposite end of the channel 24 opens into an orifice 25 formed in a plate 26. The plate 26 is fastened by the end of the sleeve 17 against an annular edge 27 provided in the channel 16. The orifice 25 opens into a channel 28 formed in a sleeve 29. The sleeve 29 extends longitudinally from the plate 26 into the channel 16 and has formed therein the ports 30 opening from the channel 28 into the channel 16. The channel 23, previously described, leads from the gear pump 10 so as to conduct a suitable fluid medium such as oil under pressure from the pump 10, through the channel 23, orifice 22, channel 24, orifice 25, channel 28 and ports 30 into the channel 16 of the driving shaft 14.

The shaft 14 is drivingly connected to a fluid coupling unit indicated generally by the numeral 31. The fluid coupling unit 31 has provided the casing portions 32 and 33, which are fastened together by bolts 34 and drivingly connected to the shaft 14. A wall 35 separates the casings 32 and 33 into chambers 36 and 37.

Rotatably mounted within the chamber 36 is a casing portion 38 drivingly connected to a shaft 39. The shaft 39 rotates freely in relation to the driving shaft 14, and there extends into the said shaft 39 an annular shaped longitudinal cavity 39A in which a portion of the shaft 14 is rotatably positioned. The opposite end of the shaft 39 is splined at 42 to a shaft 43. The shaft 43 is arranged to drive a suitable mechanism indicated generally by the numeral 44 such as a blower of the Root's type, which may be used for maintaining the cabin pressure of an aircraft at a predetermined value or the same may be used as an engine supercharger.

In general the elements 32 and 38 when associated in the relation illustrated, constitute a toroidal chamber one half of which is connected to the driving shaft 14 and the other half of which is drivingly associated with the driven shaft 39.

A plurality of radial vanes 45 are mounted in the casing 32, while a plurality of similar vanes 46 are mounted in the casing 38 for providing a fluid coupling between the casing 32 and casing 38 when a suitable quantity of coupling fluid is within the toroidal chamber.

A similar casing portion 47 is rotatably mounted within the chamber 37 and drivingly connected to a sleeve 48.

The sleeve 48 is further rotatably mounted on portion 49 of shaft 39 and bearing sleeve 50. The sleeve 48 is rotatably mounted in the anti-friction bearings 51 and has a spacing sleeve 41 provided at the opposite end rotatably mounted in relation to the casing 38 and wall 35.

The sleeve 48 is splined at the outer end at 52 to a gear 53, which intermeshes with a second gear 54 rotatably mounted on anti-friction bearings 55 carried by a stub shaft 56. The gear 54 is splined at 57 to a shaft 58, which may drive a blower of the Root's type or other suitable mechanism indicated by numeral 44.

The shafts 43 and 58 are drivingly connected by the equal sized gears 59 and 60. The gear 53, however, is of smaller size than gear 54 and the same are provided of suitable ratio, so that shaft 58 will be driven at a somewhat slower rate of speed than sleeve 48 when driven thereby through the gears 53 and 54, while shaft 58 will revolve at the same rate of speed as shaft 39 when driven by shaft 39, through shaft 43 and gears 59 and 60.

As in the case of the elements 32 and 38, the elements 33 and 47 likewise form a toroidal chamber, one half of which is connected to the driving shaft 14 through the element 32, and the other half of which is drivingly associated with the driven sleeve 48. The driving element or casing portion 33, as shown in Figure 1, is rotatably mounted on a bearing sleeve 61 positioned on the sleeve 48.

A plurality of radial vanes 62 are mounted in the casing 33, while a plurality of similar vanes 63 are mounted in the casing 47 for providing a fluid coupling, between the casing 33 and casing 47 when a suitable quantity of coupling fluid is within the toroidal chamber.

When a suitable quantity of the coupling fluid is not in the toroidal chambers formed by the elements 32 and 38; and 33 and 47, it will be readily seen that the elements 32 and 33 may rotate freely relative to the associated elements 38 and 47, respectively, in which case there will be no drive between the shaft 14 and the shaft 39 or the sleeve 48. However, as the said coupling fluid is admitted to one or the other of the toroidal chambers, the vanes carried by the casing portions 32 or 33 will exert a centrifugal force on the coupling fluid, causing the same to actuate the corresponding element 38 or 47 through the vanes carried thereby, and to be thrown from the toroidal chamber into the chamber 36 or 37, as the case may be. Any fluid medium carried within the chambers 36 or 37 will likewise be thrown by centrifugal force resulting from the rotation of the casing portions 32 and 33, through the outlet ports 64 and 65 provided in the casing portions 32 and 33, respectively, into the closed chamber or sump 66 formed by the casing 1.

The shafts 43 and 58 may drive opposite impeller blades of a Root's type blower and thus through the selected use of one or the other of the shafts 43 and 58 for the transmission of power from the shaft 39 or the sleeve 48, respectively, the transmission ratio between the driving shaft 4 and the blower 44 may be conveniently changed.

In order to control the flow of the fluid coupling medium to the toroidal chambers described and thus the selection of the shafts 43 and 58 for the transmission of power there is provided a control valve indicated generally by the numeral 67.

The valve 67 has provided a tubular member 68 slidably positioned within the sleeve 29 and in sealing relation therewith. The tubular member 68 is arranged to open and close the ports 30 provided in the sleeve 29, as previously noted. Further when the tubular member 68 is positioned in the extreme inward position, the end 69 of the tubular member 68 is adapted to seat on a seat portion 69A formed within the sleeve 29 so as to close the ports 30 and seal the same from fluid medium under pressure of the pump 10.

At the opposite end of the tubular member 68 there is formed an outwardly projecting flange 70 which may be slidably positioned along the inner surface of the channel 16 of shaft 14. Formed at the opposite end of the channel 16 from the sleeve 17 is an inwardly projecting annular flange 71, which limits the movement of flange 70 and tubular member 68 upon engagement therewith.

There is further slidably positioned in the channel 16 a sleeve 72, the movement of which is limited at one end by an annular engaging edge 73 formed within the channel 16. Formed at the opposite end of the sleeve 72 there is an inwardly projecting annular flange 74 slidably positioned on the tubular member 68. Movement of the sleeve 72 and flange 74 is limited at the opposite end from the engaging edge 73 by the end of the sleeve 29.

A helical spring 75 surrounds the tubular member 68 and one end thereof engages the outwardly projecting annular flange 70, while the opposite end thereof engages the inwardly projecting annular flange 74 normally biasing the same into engagement with the flange 71 and the end of the sleeve 29, respectively.

A port 76 is formed in the shaft 14 and leads from the channel 16 into an annular groove formed in the outer surface of the shaft 14. A port 40 provided in the sleeve 39 leads from the aforenoted annular groove into the toroidal chamber formed by the casing portions 32 and 38. The port 76 is opened and closed by movement of the sleeve 72 and thus the sleeve 72 controls the flow of fluid medium under pressure of the pump 10 into the said toroidal chamber.

A port 77 is also formed in the shaft 14 and leads from the channel 16 into an annular groove 78 formed in the outer surface of the shaft 14. A port 79 leads from the annular groove 78 into a similar annular groove 80 formed in the outer surface of the sleeve 39. A port 81 formed in the sleeve 48 leads from the groove 80 into the toroidal chamber formed by the casing portions 33 and 47. The port 77 is opened and closed by movement of the annular flange 70 and thus the flange 70 controls the flow of fluid medium under pressure into the latter toroidal chamber.

An annular groove 82 having suitable ports formed in the sleeve 72 is provided for permitting the ready egress of any fluid medium from the interior of the sleeve 72 which might possibly seep into the same so as to assure the ready operation of the valve 67. A port 83 leads from the groove 82 into an annular groove formed in the external surface of the shaft 14. A port 84 leads from the latter groove into a second annular groove formed in the external surface of the sleeve 39, while a third port 85 leads from the said second annular grooves into the chambers 36 and 37, respectively, as shown in Figure 1.

In the operation of the foregoing mechanism, it will be seen from Figure 1 that as the shaft 4 is rotated by the driving engine the pump 10 and shaft 14 will likewise be driven. The pump 10 moreover will draw a suitable fluid medium such as oil from the sump 66 and force the same through the channel 23 into the channel 24 formed in the shaft 14, as previously described.

The flanges 74 and 70 of the distributor valve 67 are normally biased by the spring 75 so as to close the ports 76 and 77. The fluid medium, however, under pressure of the pump 10 is forced through the channel 24, orifice 25, and channel 28, so as to fill the tubular member 67 and the space provided in the cavity 39A between the end of the shaft 14 and the inner surface of the cavity 39. Further the said fluid medium will be forced through the ports 30 into the channel 16 formed in the shaft 14.

It will then be seen that as the said space is filled by the fluid medium under pressure of the pump 10, a biasing force will be exerted by the fluid medium upon the exposed end surface areas of the flange 70, the end 69 of the tubular member 68, and the exposed end surface area of the flange 74. The exposed end surface area of the flange 74 is so arranged as to materially exceed that of either the surface area at the end of the flange 70 or the exposed surface area at the end 69 of the tubular member 68.

Thus, since the total pressure exerted by the fluid medium upon the flange 74 under force of the pump 10 will exceed the total pressure exerted upon the surface of the flange 70, it will be readily seen that upon such force reaching a predetermined value sufficient to overcome the biasing force exerted by the spring 75 the flange 74 will be biased away from the engaging edge of the end of the sleeve 29. Such movement of the flange 74 will expose an additional area on the flange 74 to the biasing force of the fluid medium, increasing thereby the total force exerted on the flange 74, which additional force will overcompensate the spring rate of the spring 75 causing the flange 74 to move with a snap action to the position shown in Figure 1 and thereby fully opening the ports 76. The said movement of the flange 74 will further compress the spring 75 causing the same to exert an additional biasing force on the flange 70.

The opening of the port 76 moreover permits the fluid medium to flow into the toroidal chamber formed by the driving element 32 and the driven element 38 so as to couple the two elements in driving relation in a manner well known in the art. The driven mechanism 44 is thereby drivingly connected to the driving shaft 14 through the shaft 39.

The fluid medium thus fed into the said toroidal chamber is directed under centrifugal force into the revolving chamber 36 and through the outlet port 64 provided in the casing portion 32 so as to return the fluid medium to the sump 66.

The ports 30 are of course calibrated in relation to port 76 so as to assure under normal operating conditions that the egress of fluid medium from the channel 16 through the port 76 will not exceed the ingress of fluid medium to the channel 16 through the ports 30. However, upon the speed of rotation of the aircraft engine being such that the rate of flow of the fluid medium to the port 76 under force of the pump 10 exceeds the outlet capacity of the port 76, a back pressure will be exerted by the fluid medium upon the surface area of the flange 70. Upon such back pressure having a total value sufficient to overcome the biasing force exerted by the compressed spring 75, plus the total force exerted on the surface area of the edge 69 of the tubular member 68, the flange 70 will be moved from the engaging edge of the flange 71. Such movement of the flange 70 from the engaging edge of the flange 71 will expose an additional surface area on the flange 70 to the biasing force of the fluid medium, increasing thereby the total force exerted on the flange 70. Such additional force will overcompensate the spring rate of the spring 75 causing the flange 70 to move in a snap-action into a position opening the port 77 and longitudinally moving the tubular member 68 so as to seat the end 69 on the seat portion 69A. The tubular member 68 thereby closes the ports 30 through which the fluid medium is fed to the port 76 and releases the pressure exerted by the pump 10 through the fluid medium on the flange 74. Upon release of such pressure the flange 74 is returned under the biasing force of the spring 75 into engaging relation with the edge of the sleeve 29.

Upon the closing of the ports 30, the flow of fluid medium into the toroidal chamber formed by the elements 32 and 38 will be terminated, so that as the fluid medium is directed into the chamber 36 under centrifugal force from the said toroidal chamber, the coupling relation between the driving element 32 and the driven element 38 will cease.

Moreover, upon the opening of the port 77, as described, the fluid medium will flow through the port 77, annular channel 78, port 79, annular channel 80, and port 81 into the toroidal chamber formed by the driving element 33 and the driven element 47 so as to couple the two elements in driving relation in a manner well known in the art. The driven mechanism 44 is thereby drivingly connected to the driving shaft 14 through the sleeve 48, reduction gearing 53 and 54, and shaft 58. It will further be seen that since the gear 53 is arranged to drive the gear 54 at a slower rate of speed than the rotation of the driven sleeve 48, the shaft 58 and thus the mechanism 44 will be driven at a substantially slower rate of speed than the driving shaft 14.

Thus upon the shaft 14 rotating at a rate of speed less than a predetermined value the mechanism 44 will be driven through the shaft 43 at a rate of speed substantially the same as the driving shaft 14. However, upon the shaft 14 rotating at or in excess of the predetermined rate of speed, the mechanism 44 will be driven through the shaft 58 at a rate of speed substantially less than the rate of speed of the shaft 14. Thus the mechanism 44 may be driven at a rate of speed within a predetermined range.

Moreover, port 77 is provided of such a size that upon the driving speed of the shaft 14 dropping below a predetermined minimum value the pressure exerted by the fluid medium under force of the pump 10 will be insufficient to hold the flange 70 against the biasing force of the spring 75. In such case the flange 70 will be biased by the spring 75 so as to cause the end 69 of the tubular member 68 to move out of engagement with the seat 69A opening a portion of the ports 30 and permitting a flow of the fluid medium through the same and into the channel 30 causing a further decrease in the biasing force exerted at the flange 70. Further, upon the end 69 of the tubular member 68 breaking away from the seat 69A, there is presented a further surface area which is acted upon by the biasing force of the fluid medium in such a manner as to assist the biasing force of the spring 75. Thus the decrease in the biasing force exerted on the flange 70, as described, coupled with the added biasing force exerted at the end 69 tends to move the tubular member 68 after its initial break from the seat 69A in a snap action into engaging relation with the flange 71. Such movement of the tubular member 68 opens the ports 30 and causes the flange 70 to close the port 77. Upon the closure of the port 77 the supply of fluid medium to the toroidal chamber formed by the elements 33 and 47 is discontinued, whereupon the coupling relation between the driving element 33 and the driven element 38 will cease. Upon suitable pressure being applied to the flange 74 the cycle of operation may be repeated.

Although only one embodiment of the invention has been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. A fluid distributor means, comprising, in combination, a conduit for a fluid medium, said conduit having an inlet port for said fluid medium and first and second outlet ports, a first valve for controlling said first outlet port, a second valve for controlling said second outlet port and said first and second valves slidably mounted in said conduit, a third valve for controlling said inlet port, said third valve operably connected to said second valve, spring tension means positioned between said first and second valves, said spring tension means for biasing said valves in opposite directions in said conduit for closing said first and second outlet ports and opening said inlet port, whereby said fluid medium may enter said conduit for exerting a biasing force upon said first valve for opening said first outlet port.

2. A fluid distributor means, comprising, in combination, a conduit for a fluid medium, said conduit having an inlet port for said fluid medium and first and second outlet ports, a first valve for controlling said first outlet port, a second valve for controlling said second outlet port and said first and second valves slidably mounted in said conduit, a third valve for controlling said inlet port, said third valve operably connected to said second valve, spring tension means positioned between said first and second valves, said spring tension means for biasing said valves in opposite directions in said conduit for closing said first and second outlet ports and opening said inlet port for permitting said fluid medium to enter said conduit so as to exert a biasing force upon said first valve for opening said first port and further causing said spring tension means to exert an increased biasing force upon said second valve, whereby upon a further predetermined increase in the biasing force of said fluid medium said second valve may be biased in opposition to said spring tension means in such a manner as to open said second outlet port to said fluid medium and actuate said third valve so as to close said inlet port.

3. A control means, comprising, in combination, a fluid pressure chamber, first and second control members movably mounted in said chamber, spring tension means biasing said members in opposite directions, and contacting members engaging said control members for limiting the movement thereof in said opposite directions, each of said control members having a surface area exposed to said fluid pressure for actuation thereby, and one of said control members having a greater surface area exposed to said fluid medium than the other of said control members, whereby said one control member may be actuated by a lesser fluid pressure than the other of said control members, and means for limiting the movement of said control members under said fluid pressure.

4. A control means, comprising, in combination, a fluid pressure chamber, first and second control members movably mounted in said chamber, spring tension means biasing said members in opposite directions, each of said control members having a surface area exposed to said fluid pressure for actuation thereby, and one of said control members having a greater surface area exposed to said fluid medium than the other of said control members, contacting members engaging said control members at said surface areas for decreasing the area exposed to said fluid medium and for limiting the movement of said control members in response to the biasing force of said spring tension means, whereby said control members may be successively actuated with a snap action by said fluid pressure at different pressure values, and means for limiting the movement of said control members under said fluid pressure.

5. A control means, comprising, in combination, a fluid pressure chamber, first and second control members movably mounted in said chamber for actuation by the fluid pressure in said chamber, one of said control members having a greater exposed surface area for actuation by said fluid pressure than the other of said control members, a spring member for biasing both of the control members in opposition to the fluid pressure, said spring member exerting, at least at first, an equal bias on each of the control members, and means for increasing the surface area of each of said control members upon actuation, whereby said control members may be actuated by said fluid pressure at different pressure values.

FINLEY R. PORTER.

REFERENCES CITED

The following references are of record in the file of this patent:

UNITED STATES PATENTS

| Number | Name | Date |
|---|---|---|
| 2,138,988 | Thomas | Dec. 6, 1938 |
| 1,202,263 | Bills | Oct. 24, 1916 |
| 2,306,469 | Rupley | Dec. 29, 1942 |
| 2,341,624 | Kieser | Feb. 15, 1944 |
| 2,067,793 | Seubold | Jan. 12, 1937 |
| 2,018,616 | Martyrer | Oct. 22, 1935 |
| 1,533,767 | Schmidt | Apr. 14, 1925 |
| 2,318,187 | Addison | May 4, 1943 |
| 1,987,985 | Bauer | Jan. 15, 1935 |
| 1,362,621 | Hawley | Dec. 21, 1920 |
| 2,283,435 | Halford et al. | May 19, 1942 |
| 311,147 | Richardson | Jan. 20, 1885 |
| 2,223,715 | Berger | Dec. 3, 1940 |
| 2,319,706 | Reit | May 18, 1943 |
| 2,189,537 | Swennes | Feb. 6, 1940 |

FOREIGN PATENTS

| Number | Country | Date |
|---|---|---|
| 502,717 | British | Mar. 23, 1939 |